Oct. 20, 1931.  M. B. MORGAN  1,827,948

MEANS FOR ADJUSTING BRAKES AND OTHER DEVICES

Filed Feb. 23, 1928

INVENTOR:
Mathew B. Morgan,
by Cau+Cau+Gravely,
HIS ATTORNEY

Patented Oct. 20, 1931

1,827,948

UNITED STATES PATENT OFFICE

MATHEW B. MORGAN, OF DETROIT, MICHIGAN, ASSIGNOR TO THE TIMKEN-DETROIT AXLE COMPANY, OF DETROIT, MICHIGAN, A CORPORATION OF OHIO

MEANS FOR ADJUSTING BRAKES AND OTHER DEVICES

Application filed February 23, 1928. Serial No. 256,120.

My invention is applicable to brakes of the type wherein the friction members are actuated by a cam on a rock shaft that is provided with an actuating lever. In the ordinary form of expansion brake, the cam is located in the gap between the ends of the brake band or between the free ends of pivoted brake shoes. In such construction, the operating lever usually is more or less permanently fixed to the cam shaft and consequently the angular position of the operating lever arm for set position, for instance, varies with the wear of the brake band or brake shoes. Such variation of the operating lever is objectionable for divers reasons; and the principal object of the present invention is to devise means whereby the friction devices may be adjusted without disturbing the position of the end of the lever arm. It consists principally in clamping such arm or other member on the shaft by means of a clamping pin or bolt that is provided with a worm thread that meshes with worm teeth on the shaft, whereby the turning of the clamping pin serves to rotate the shaft. It also consists in the combinations of parts hereinafter described and claimed.

Figure 1:
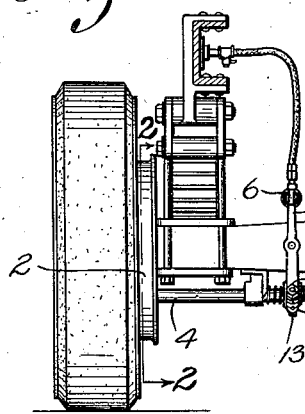
Figure 2:
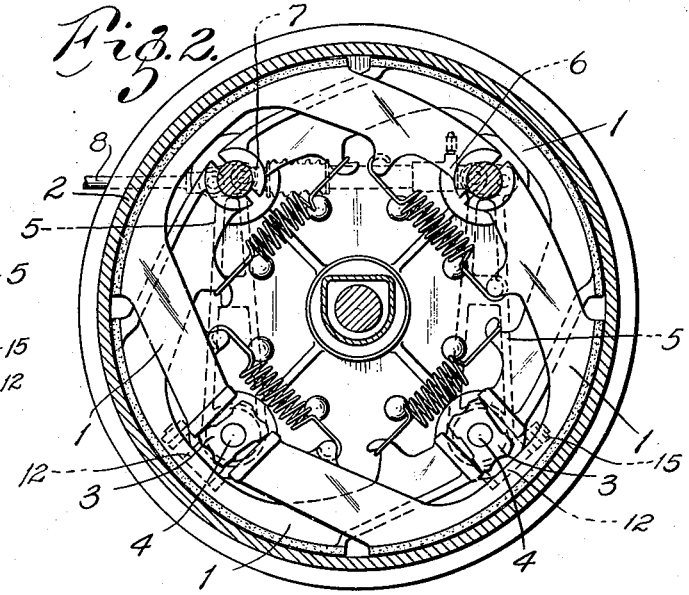
Figure 3:
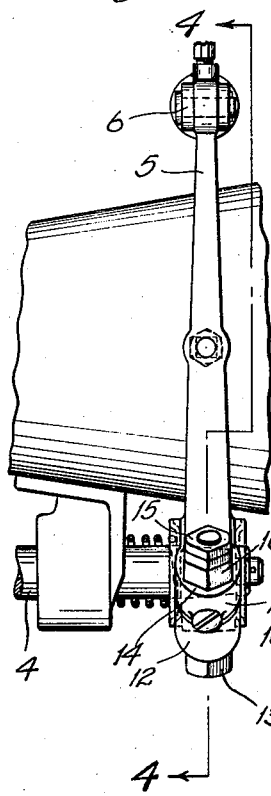
Figure 4:
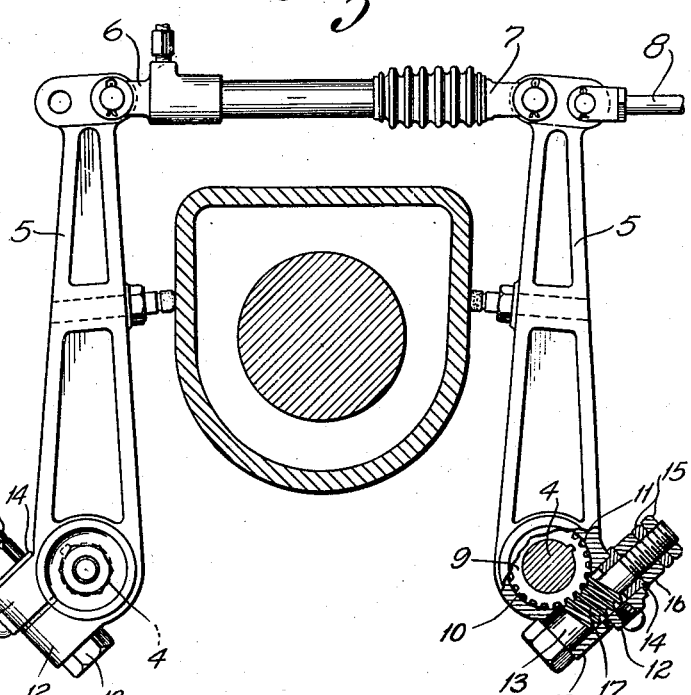

In the accompanying drawings, wherein like reference numerals refer to like parts wherever they occur, Fig. 1 is an elevation of part of a vehicle provided with my invention, Fig. 2 is an enlarged vertical section through the brake drum on the line 2—2 in Fig. 1, Fig. 3 is a fragmentary side elevation of the axle housing, showing the brake lever mounted on the cam shaft; and Fig. 4 is a vertical section on the line 4—4 in Fig. 3.

For purposes of illustration the accompanying drawing shows my device applied to a duplex brake of the type shown in Alden Patent No. 1,135,148 dated April 13, 1915, wherein two pairs of pivotally mounted brake shoes 1 are arranged to cooperate with a single brake drum 2, each pair being actuated by its own cam 3, cam shaft 4 and actuating lever arm 5. As illustrated in the accompanying drawings, the free end of each lever arm has a link or member 6, 7 pivotally connected thereto, the outer end of one link 6 embodying a cylinder and the outer end of the other link 7 embodying a piston that works in said cylinder, the cylinder being arranged to communicate with a source of fluid pressure that is suitably controlled to elongate the link and spread apart the ends of the actuating lever arms and thereby set the brakes, all as more fully described in my application for patent therefor Serial No. 242,585 filed December 27, 1927. The free end of one of said arms is also provided with a pull rod 8 or other suitable device in position to be manipulated by the operator. With devices of this type that are responsive to two or more different actuating devices, it is very desirable to be able to adjust the friction elements for wear without disturbing the initial relation of the lever arms to each other or to the other parts of the actuating devices.

According to the present invention, each cam shaft has a collar or ring 9 keyed or otherwise fastened thereon whose outer surface is provided with worm teeth 10. The lever arm has its end bored out to fit rotatably on said shaft, the wall 11 of the bore being slotted and thin enough to be resilient and having lugs 12 on opposite sides of the slot or gap. In effect, the bored end of the lever arm constitutes a split resilient clamping sleeve. Such lugs are perforated to receive a headed clamping pin or bolt 13 which extends through said lugs and has its projecting end provided with a screwthread over which is placed a washer 14 and on which work clamping nuts 15 and a locking nut 16.

The portion of the clamping pin or bolt 13 between the lugs is provided with a worm thread 17 arranged to mesh and cooperate with the worm teeth 10 of the collar on the shaft, whereby the turning of the clamping pin causes the shaft to turn in the eye or sleeve of the lever arm. Of course, such turning of the clamping pin is effected while the clamping and locking nuts are loose; for the tightening of such nuts springs the jaws of the sleeve causing them to grip tight around the shaft and effectually lock the lever arm on the shaft in its adjusted position.

By this arrangement, the shaft is rotatable in the sleeve when the nuts are loosened, whereas the shaft and lever arm are rigidly held together when the clamping nut is tightened to make the resilient sleeve bind fast around the shaft and when the nuts are loosened, the clamping pin or bolt can be turned on its axis, as by means of a wrench applied to its head, in consequence of which the rotation of the worm on such bolt is transmitted through the worm teeth to the shaft, which is thus turned to any angular position desired. In the foregoing description, the shaft is described as rotating in the sleeve of the arm, which is supposed to remain in its initial position. This capacity for adjusting the angular position of the shaft without disturbing the position of the arm is especially desirable in such cases as that of the duplex brakes above mentioned, as it enables the brake shoes to be easily and quickly adjusted for wear without affecting the positions of the lever arms. On the other hand, the shaft may be kept from rotating, in which case the turning of the worm results in swinging the arm about the shaft.

While I have described by new adjusting means as applied to a duplex brake, it is obviously applicable to ordinary brakes, and to other devices wherein it is desirable to mount an arm or like member on a shaft in such manner as to provide for angular adjustment thereof.

What I claim is:

1. The combination with an axle housing and road wheels rotatable relative thereto and having brake drums thereon, of brake actuating mechanism for each wheel comprising two sets of pivotally mounted brake members for each drum, a cam shaft for each pair of brake members, a lever arm mounted on each cam shaft, and means for adjusting the angular relation of each shaft with relation to its lever arm, said lever arms being on opposite sides of said axle housing and connected together by an elongatable link adapted to spread said lever arms apart to actuate both sets of brake members.

2. The combination with an axle housing and road wheels rotatable relative thereto and having brake drums thereon, of brake actuating mechanism for each wheel comprising two sets of pivotally mounted brake members for each drum, a cam shaft for each pair of brake members, a lever arm mounted on each cam shaft, and means for adjusting the angular relation of each shaft with relation to its lever arm, said lever arms being on opposite sides of said axle housing and connected together by an elongatable link adapted to spread said lever arms apart to actuate both sets of brake members, and a pull rod for actuating one of said levers.

3. The combination with an axle housing and road wheels rotatable relative thereto and having brake drums thereon, of brake actuating mechanism for each wheel comprising two sets of pivotally mounted brake members for each drum, a cam shaft for each pair of brake members, upwardly extending lever arms mounted on their respective cam shafts and located on opposite sides of said housing, means including a slip joint for connecting said levers, means for actuating both of said lever arms simultaneously and means for actuating one of them separately, means for angularly adjusting and locking said lever arms on their shafts, said last mentioned means comprising teeth on the rock shafts and pins for tightening the grip of said arms on said shafts which pins are provided with threads that cooperate with said teeth to turn the shafts relatively to said arms and lock the same in adjusted positions.

4. The combination of an axle housing and road wheels rotatable relative thereto and having brake drums thereon of brake actuating mechanism for each wheel, each brake actuating mechanism comprising a pair of pivotally mounted brake members, a rock shaft having a cam operatively associated with said brake members to actuate the same, a collar fixed on said shaft and having worm teeth on the periphery thereof, a lever arm comprising a split sleeve rotatably mounted on said collar, and means for adjusting and locking said lever arm and collar together, said means comprising a locking pin swiveled in the ends of said split sleeves and having a worm thereon engaging said worm teeth, whereby turning of said pin causes said shaft to turn in said sleeve, the two lever arms being on opposite sides of the axle housing and connected together by an elongatable lever adapted to spread said lever arms apart, and means for actuating one of said lever arms independently of the other.

Signed at Detroit, Michigan, this 20th day of February, 1928.

MATHEW B. MORGAN.